UNITED STATES PATENT OFFICE.

ROBERTO C. BONE, OF MANAGUA, NICARAGUA, ASSIGNOR OF ONE-HALF TO MANUEL A. ESTEVA, OF NEW YORK, N. Y.

SUBSTITUTE FOR LINSEED-OIL AND PROCESS OF MAKING SAME.

1,347,074.   Specification of Letters Patent.   Patented July 20, 1920.

No Drawing.   Application filed March 23, 1918.   Serial No. 224,313.

*To all whom it may concern:*

Be it known that I, ROBERTO C. BONE, a citizen of Nicaragua, residing at Managua, Nicaragua, have invented certain new and useful Improvements in Substitutes for Linseed-Oil and Processes of Making Same, of which the following is a full, clear, and exact description, such as will enable others skilled in the art to which it appertains to make and use the same.

This invention relates to substances suitable for use as substitutes for linseed oil and to processes for making such substances.

One of the objects of this invention is the provision of a practical process for the production of a substance which may be used as a substitute for linseed oil and whereby said substitute may be produced quickly and at a minimum of expense.

Another object of this invention is the provision of a substance which may be used as a substitute for linseed oil.

Other objects will be in part obvious and in part pointed out hereinafter.

The invention accordingly consists in the several steps and the relation and order of one or more of such steps with relation to each of the others thereof which will be exemplified in the hereinafter disclosed process, and the scope of the application of which will be indicated in certain of the claims that follow, and also consists in the combinations of elements hereinafter set forth and the scope of the application of which will be indicated in other claims which follow.

The process involves the use of a lubricating oil, with kerosene oil added, if desired, and the treatment thereof with certain substances giving brilliancy, drying qualities and odor to the substance to produce the substitute referred to.

Other substitutes for linseed oil have involved the use of materials and ingredients which are very costly compared to the ingredients herein referred to.

In carrying out the present embodiment of the invention several tanks or containers may be employed. One of these tanks is equipped with heating means and means whereby the contents of the tank may be agitated, a steam heated worm being found suitable for the purposes desired. In this tank is placed a quantity of kerosene, a quantity of lubricating oil and some rosin. The mixture formed by these ingredients is heated to the boiling point and allowed to boil for a substantial length of time, three-quarters of an hour to one hour being sufficient. Meanwhile the ingredients are well mixed together. The result of this boiling effects the dissolving of the rosin and incorporates the lubricating oil and rosin into the kerosene. After this mixture has boiled for the proper time, a drier, such as hydrate or borate of manganese is added thereto, and this new mixture is allowed to boil for some time, fifteen minutes being usually sufficient, thereby thoroughly incorporating the drier into the mixture. Agitating or stirring the mixture during the addition of the drier is found to aid the proper mixing of the ingredients, and to facilitate oxidation. Finally the liquid in this tank may be passed into another tank, and a small quantity of red-cod oil added thereto and the mixture allowed to rest for a period of time, say about twelve hours. The resultant substance is found to be available for use as a substitute for linseed oil, and to possess most of the desirable qualities thereof, the odor being quite the same, and the product being in a generally acceptable commercial form.

In the above described process it is found satisfactory to use, in the first tank, approximately sixty parts, by weight of kerosene oil with forty parts of lubricating oil and to add thereto approximately ten parts of rosin. The kerosene oil need not be of the finest quality, but if the quality is very poor and the oil has an objectionable odor, it is well before using it in this process to treat it in the following manner: Place the kerosene in a tank and mix therewith a quantity of hydrochloric acid and chlorid lime, using about thirty pounds of hydrochloric acid and about fifty pounds of the lime to 1,000 gallons of kerosene. Then after allowing this mixture to rest for about twelve hours withdraw the supernatent liquid into another tank and add thereto a quantity of calcium oxid, using about fifty pounds of calcium oxid for the quantities mentioned. After this mixture has been allowed to rest for about six hours, the supernatant liquid will be found to be colorless and free from the objectionable odor, and may be employed in the process with more success than the untreated kerosene oil mentioned.

The lubricating oil may comprise a vegetable oil; for example, cotton seed oil, or a mineral oil or may consist of a combination of the two. It is expedient to use almost any inexpensive lubricating oil which is light in color and odorless. The borate of manganese is added in a quantity of about two and one-eighth parts. Hydrate of manganese may be used in place of borate of manganese in like quantities with similar results. About one part of red-cod oil will impart to the product the characteristic odor of linseed oil.

It is permissible in carrying out the process to omit the kerosene oil entirely, using only lubricating oil in connection with a drier and rosin and adding the red-cod oil if desired, all in the quantities and manner before described. Nevertheless as lubricating oil is more expensive than kerosene the use of kerosene is favored.

The periods of time required for boiling, agitating and rest in connection with the different substances above referred to have been found to be most efficient. It is to be understood, however, that good results follow from even longer or shorter periods, depending somewhat upon the bulk of material used. Sufficient time should be given for the complete and permanent intermixing of the ingredients.

Thus by the above described process is produced a substance having many of the qualities of linseed oil and which may be aptly termed artificial linseed oil. Its characteristics are similar to linseed oil and it may be effectively used wherever linseed oil could be used. Thus are accomplished, among others, the objects hereinbefore referred to.

Having described my invention, what I claim as new and desire to secure by Letters Patent is—

1. A process of producing a substitute for linseed oil comprising boiling a lubricating oil in the presence of a drier and rosin.

2. A process of producing a substitute for linseed oil comprising boiling a mixture of kerosene oil and lubricating oil in the presence of a drier and rosin.

3. A process of producing a substitute for linseed oil comprising boiling a mixture of kerosene oil and lubricating oil in the presence of rosin, thereafter adding drier and boiling the resultant mixture while agitating the same.

4. A process of producing a substitute for linseed oil comprising boiling a mixture of kerosene oil and lubricating oil in the presence of rosin, thereafter adding hydrate of manganese and boiling the resultant mixture while agitating the same.

5. A process of producing a substitute for linseed oil comprising boiling a mixture of kerosene oil and lubricating oil in the presence of rosin, thereafter adding hydrate of manganese and boiling the resultant mixture while agitating the same, and thereafter adding red-cod oil and permitting the resultant mixture to rest.

6. A process of producing a substitute for linseed oil comprising boiling a mixture of kerosene oil and lubricating oil for about one hour in the presence of rosin, thereafter adding hydrate of manganese and boiling the resultant mixture for about one-quarter hour while agitating the same, and thereafter drawing off the liquid product and adding red-cod oil and permitting the resultant mixture to rest for approximately twelve hours.

7. The process of producing a substitute for linseed oil, which includes mixing kerosene oil with lubricating oil a drier and rosin in the proportion of about sixty parts kerosene oil to forty parts lubricating oil and ten parts of rosin.

8. The process of producing a substitute for linseed oil, which includes mixing kerosene oil with lubricating oil, rosin and hydrate of manganese in the following proportions: sixty parts kerosene oil, forty parts lubricating oil, ten parts rosin, and two and one-eighth parts hydrate of manganese.

9. The process of producing a substitute for linseed oil, which includes mixing kerosene oil with lubricating oil, rosin, hydrate of manganese and red-cod oil in the following proportions: sixty parts kerosene oil, forty parts lubricating oil, ten parts rosin, two and one-eighth parts hydrate of manganese and one part red-cod oil.

10. The process of producing a substitute for linseed oil, which includes mixing sixty parts kerosene oil with forty parts lubricating oil and mixing with that mixture ten parts of rosin; heating this mixture to boiling, continuing the boiling for approximately fifty minutes, agitating the mixture, adding thereto two and one-eighth parts of hydrate of manganese, causing the mixture to boil for about fifteen minutes, stirring the ingredients during the addition of the manganese, withdrawing the supernatent liquid from this mixture, adding thereto about one part of red-cod oil, and allowing the resultant mixture to rest for approximately twelve hours.

11. An artificial oil comprising a mixture of lubricating oil, rosin and hydrate of manganese.

12. An artificial oil comprising a mixture of kerosene oil, lubricating oil, rosin and hydrate of manganese.

13. An artificial oil comprising a mixture of kerosene oil, lubricating oil, hydrate of manganese, rosin and red-cod oil.

14. A process of producing a substitute for linseed oil comprising boiling a lubricating oil in the presence of rosin, thereafter adding a drier and boiling the resultant mixture.

15. A process of producing a substitute for linseed oil comprising boiling a mixture of kerosene and lubricating oil in the presence of rosin, thereafter adding a drier and boiling the resultant mixture.

16. A process of producing a substitute for linseed oil comprising boiling a lubricating oil in the presence of rosin approximately one hour, thereafter adding a drier and boiling the resultant mixture approximately one quarter of an hour.

In testimony whereof I affix my signature in the presence of two witnesses.

ROBERTO C. BONE.

Witnesses:
J. W. ANDERSON,
C. J. KULBERG.